US006536701B2

(12) United States Patent
Fulton et al.

(10) Patent No.: US 6,536,701 B2
(45) Date of Patent: Mar. 25, 2003

(54) APPARATUS AND METHOD FOR WINDING ELECTRICAL COILS

(75) Inventors: Norman Neilson Fulton, Leeds (GB); Paul Greenhough, Cleckheaton (GB)

(73) Assignee: Switched Reluctance Drives Limited, Harrogate (GB)

(*) Notice: Subject to any disclaimer, the term of this patent is extended or adjusted under 35 U.S.C. 154(b) by 119 days.

(21) Appl. No.: 09/824,952

(22) Filed: Apr. 3, 2001

(65) Prior Publication Data

US 2001/0025897 A1 Oct. 4, 2001

(30) Foreign Application Priority Data

Apr. 4, 2000 (GB) ................................. 0008268

(51) Int. Cl.⁷ ........................... B21F 3/04; B65H 81/06; H01C 17/04; H01F 41/06
(52) U.S. Cl. ................................................. 242/437.4
(58) Field of Search ........................... 242/437, 437.1, 242/437.2, 437.4

(56) References Cited

U.S. PATENT DOCUMENTS 3,497,147 A * 2/1970 McBroom et al. .......... 242/437
3,543,067 A    11/1970 Tharp
4,394,203 A *  7/1983 Bompard et al. ........... 242/437

FOREIGN PATENT DOCUMENTS

| DE | 34 32 812 A1 |   | 3/1986 |           |
|----|--------------|---|--------|-----------|
| DE | 298 06 718 U1|   | 11/1998|           |
| EP | 0096836      | * | 8/1983 | ......... 242/437 |
| JP | 55-68606     | * | 6/1980 | ......... 242/437.2 |

OTHER PUBLICATIONS

Say, M.G., "The Performance and Design of Alternating Current Machines," Third Edition, Pitman Paperbacks, 1958, pp. 196–217.

* cited by examiner

Primary Examiner—Emmanuel Marcelo
(74) Attorney, Agent, or Firm—Dicke, Billig & Czaja, P.A.

(57) ABSTRACT

A coil former allows transposition between layers of turns in a coil to be accomplished without damage. The transpositions can be made in a short side of the coil. The former has finned portions which guide the wire into the correct locations during winding. When the coil is wound, the former is disassembled and the end portions are pulled towards the center of the former and turned through 90° to be removed. A method of using the former is described.

20 Claims, 5 Drawing Sheets

"Active" length

APPARATUS AND METHOD FOR WINDING ELECTRICAL COILS

CROSS-REFERENCE TO RELATED APPLICATION

The subject matter of this application is related to the subject matter of British Application No. GB 0008268.5, filed Apr. 4, 2000, priority to which is claimed under 35 U.S.C. § 119 and which is incorporated herein by reference.

BACKGROUND OF THE INVENTION

1. Field of the Invention

This invention relates to the winding of coils used in electrical machines, particularly those machines in which one coil does not overlap an adjacent coil.

2. Description of Related Art

Electrical machines make use of flux flowing in a magnetic circuit to convert energy from one form to another. A transformer can be used to convert energy from one voltage level to another. Rotating electrical machines convert electrical energy to mechanical energy when acting as a motor, and mechanical energy to electrical energy when acting as a generator. All of these machines require electrical windings which carry either excitation or load current. These windings are typically composed of one or more coils of conducting wire (e.g. copper or aluminum) which is coated with insulating enamel to provide electrical insulation between adjacent turns of the coil.

Because of the wide variety of machines in existence, many different types of windings are required and different techniques are required for the satisfactory manufacture of the differing shapes of coils. For relatively small machines, round wire is normally used and, because production volumes are often high, automated methods are known for producing the required coils. Typically these coils have large numbers of turns, e.g. 100 turns or more, and the wire is relatively fine, e.g., less than 0.5 mm in diameter, so the coils are "random" or "mush" wound, i.e. the position of any one turn within the coil is not predetermined. As the machine size increases, the number of turns required falls and the wire cross-section has to increase to carry the larger currents required. This leads to the adoption of a "layered" winding, where the position of each turn in the coil is controlled to give the highest possible amount of conductor in a given cross-sectional area. FIG. 1 shows a cross-section of such a coil where the turns are arranged in a "hexagonal packing" format. This construction is typically adopted for wire diameters between 1 and 5 mm.

However, for larger machines, which generally require fewer turns in the coil, the best use of the available space requires rectangular section wire. Such wire, while capable of yielding a very high density of wire in a given space, is much more difficult to wind and normally involves a labor-intensive process. A cross-section of a coil wound with rectangular strip wire to give a close-packed format is shown in FIG. 2.

The required profile of the coil is very dependent on the type of electrical machine. In machines which employ a rotating wave of magneto-motive force (mmf), a "distributed" winding is typically employed, in which each coil spans several slots in the stator and therefore overlaps one or more adjacent coils. In order to accommodate the coil overhang (defined as the portion of the coil outside the active length of the stator core), a diamond shape is often used, as illustrated in FIG. 3. Such coils and their methods of production are discussed in many textbooks, e.g. "The Performance and Design of Alternating Current Machines", M. G. Say, Third Edition, published by Pitman in 1958, Chapter 10, pp. 196 to 216, which is incorporated herein by reference.

In other types of machines, a coil spans only a single tooth or pole. These machines often have stators with parallel-sided poles, so it is conventional to wind the coils on a former and subsequently mount the coil on the pole with a suitable insulation system between the pole and the coil. Such coils are found in DC machines (in the field winding) and in switched reluctance machines. The side and center section views of a typical coil profile are shown in FIG. 4, in which, for clarity, the coil is shown as composed of only four turns. Also shown in FIG. 4 is the former on which the coil is wound. The former has a body 42 (which typically mimics the dimensions of the pole to which the coil will eventually be mounted) and sides 43 and 44 to maintain the correct width of the coil during winding. The thickness of the body of the former, dimension T in FIG. 4, is generally equal to the width of the pole, with an adjustment for the thickness of the insulation around the pole, if necessary. The width between the sides of the former, dimension W in FIG. 4, is generally a little less than the length of the pole.

The cross-sectional view of the coil in FIG. 4 is schematic in that it shows the coil as being close-packed at all points. However, as is well known to those skilled in the art, there are always voids in the coil at the point where a transition is made from one layer to another. This will now be explained by reference to FIG. 5, where the coil of FIG. 4 is shown partly made. The coil is started by bringing the wire in through the side of the former at the point marked "Start" and is bent through 90° to begin the first turn. The cross-section marked 51s denotes the start of the first turn, at the top of the former. The wire is led down behind the former and appears at the bottom, as denoted by the cross section 51m, the middle of the first turn. This turn is completed by taking the wire, here marked as 51' back to the top of the former, but it must be displaced laterally to lie beside 51s. Thus, it is led diagonally to the position shown as 51f, the finish of the first turn. A triangular void 54 is produced between 51' and the side 44.

The point 51f is also the start of the second turn, in which the wire is led down behind the former, appearing in the position marked 52m, i.e. the middle of the second turn. To complete this turn, the wire, now marked as 52', must be led to the top of the former, but must lie on top of the portion marked 51', which, at the top of the former, is already occupying the space adjacent the former body. Raising the portion 52' leaves a triangular void beneath it, bounded by the portion 51', the side piece 43, the former body 42 and the portion of wire 52'. The portion marked 52' completes the second turn at the cross-section marked 52f. It will now be seen that the turns lie parallel and adjacent each other behind, below and on top of the former. However, on the long side of the former carrying the second half of each turn, there are triangular voids between the sides of the former and the first and last turns, respectively. Because FIG. 5 is drawn for simplicity, there are only two turns per layer and the triangular void is exaggerated. Nevertheless, it illustrates the situation in which, by transposing between layers along the long side of the coil, this side occupies a greater height than the other side (which is only the height of the single turn).

It is well-understood by the skilled person that the transposition in the next layer of the coil runs diagonally in the opposite direction (i.e. the wire portion corresponding to 51' will run from lower left to upper right), and that the third layer is laid down in the same direction as the first, etc. A complete coil is therefore found to have the transpositions running in alternate directions in alternate layers and to have triangular voids at opposite sides of the coil running in alternate directions in these alternate layers. In a coil with many layers, the side with the transpositions will typically be between 1.3 and 1.6 times the thickness of the other side. This increase in coil side thickness can give rise to a major difficulty when mounting the coils on the poles of the stator, and is often the limiting feature in the design of the winding.

In order to alleviate this difficulty and to provide a coil in which the long sides have the same cross-section, it is known to make the transpositions between layers occur in the short side of the coil (i.e. in the top, circular portion of the former shown in FIG. 5). In this case, the start of the coil is kept as far to the back of the former as possible and the second long side of the first turn (corresponding to 51') is kept parallel to the side 44 of the former, only being allowed to traverse diagonally across after it passes onto the circular portion. While this gives the desired parallel sides down the length of the coil, the distance allowed for the transposition is very short and the wire has to be very accurately formed to maintain the correct dimensions. This involves a great deal of manipulation of the wire by the coil winding person which greatly increases the cost of the coil and often leads to damage of the insulation on the wire. During manipulation of the wire, the tension which is conventionally exerted on the wire to produce a tightly packed coil has to be released, often causing the turns already formed to spring out of position and add to the difficulty of manufacture.

SUMMARY OF THE INVENTION

There is therefore a need for a former which can economically produce coils with the transposition in the short side of the coil without damaging the wire insulation.

Embodiments of the invention provide guide channels for each turn of the winding on the post or posts mounted on the body of the former. In this way, the turns are entrained to follow the correct path. The side walls between the channels on the former define an aperture so that a turn in one channel can traverse across to start the next turn at a predefined point. Embodiments of the invention provide means for quickly and accurately laying down layered windings, which has been needed, but not available, for many years.

BRIEF DESCRIPTION OF THE DRAWINGS

The invention can be put into practice in a number of ways, some of which will now be described by way of example and with reference to the accompanying drawings, in which.

DETAILED DESCRIPTION OF PREFERRED EMBODIMENTS

Figures 6, 6A:
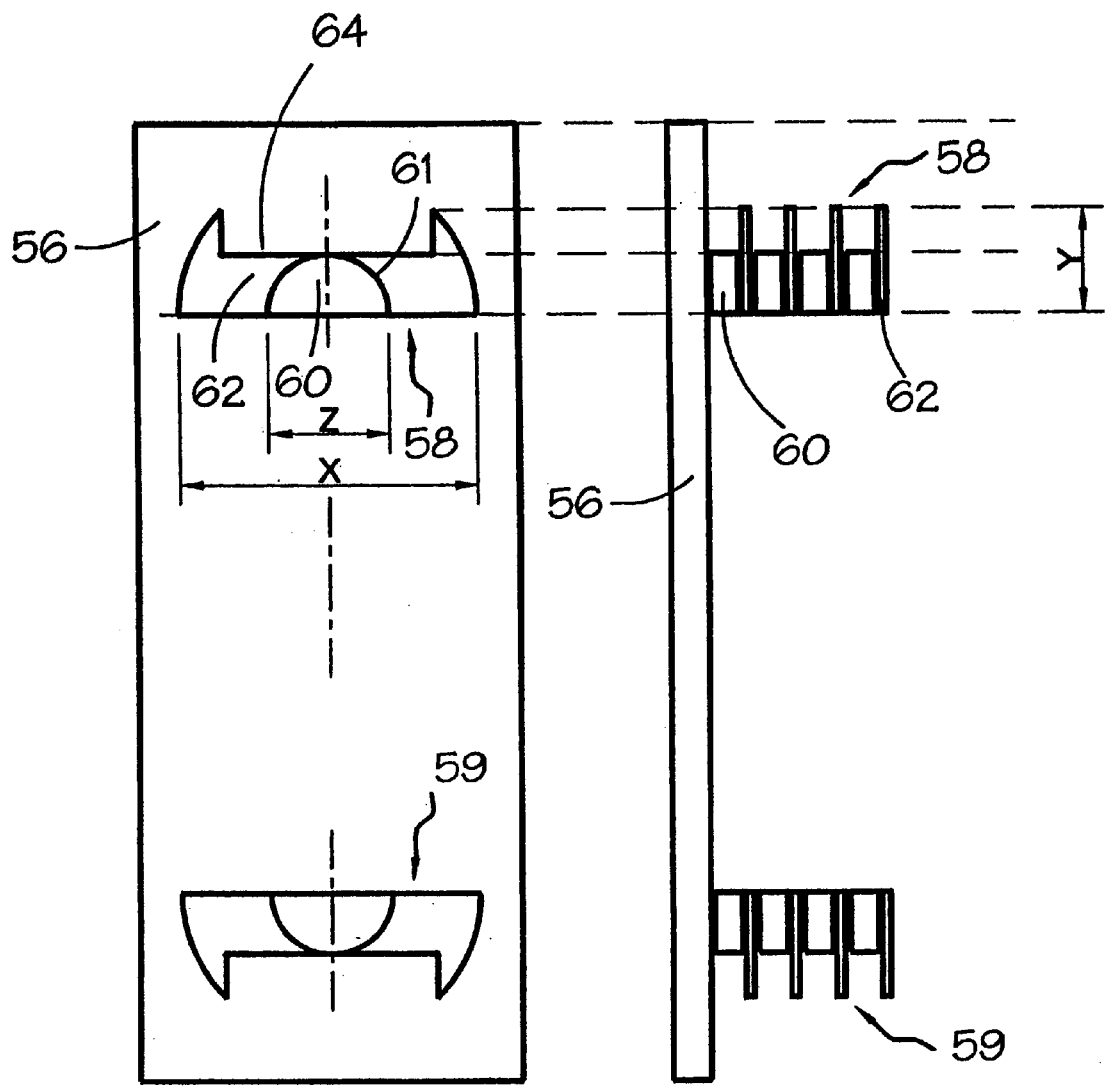
FIGS. 6 and 6A show side and cross-sectional views of a former according to one embodiment of the invention.

FIGS. 6 and 6A show a coil former according to one embodiment of the invention. The former has at least one plate 56, although it may be bounded on both sides by opposed side plates. The former has two end posts 58 and 59. One end post 58 is composed of a stack of discate sections 60 and finned sections 62. For a coil with N turns per layer, there are N discate sections separated by N finned sections, thus defining N guide channels in which the outer surface 61 of each section 60 is the channel base and the fins are the side walls for adjacent channels. The outer surface 61 of the discate sections 60 is profiled to define the shape of the turns in the region of the overhang. In the example of FIG. 6 this profile is semicircular, with a diameter Z corresponding to the width of the stator pole on which the coil will be mounted. The discate sections 60 have a thickness equal to, or slightly greater than, the width of the wire being used for the coil. The finned sections 62 have a width X which is approximately equal to the overall width of the finished coil and a height Y which is not greater than the width Z of the discate section 61. The finned sections have an interrupted profile in the form of a cutaway 64 such that in the center of the fm there is no obstruction between adjacent discate sections 61 as the cutaway defines a gap for the condition to pass through. In this embodiment the center of the cutaway 64 lies flush with the outer surface of the sections 61. However, the profile of the cutaway could lie below the outer surfaces of the sections 61.

The opposite end post 59 in this embodiment is the same as the end post 58 just described. This is for reasons of economy realized by manufacturing the pieces of the same shape. However, due to the route followed by the coil wire, the finned sections in the opposite end post 59 do not need the cutaway profile 64. Indeed, it is possible to make the opposite end post plain, i.e. without any finned protrusions or other guides. However, the guide channels formed by the fins usefully serve to define the correct path for the wire to follow at both ends of the former. This provides a guide on each of the end posts for each turn of the coil.

It will be observed that a former constructed in this way has a greater width than that of the prior art, because of the thickness of the finned sections. The thickness of the finned sections is chosen to give adequate strength to the section when the stiffness of the wire and the winding tension are taken into account.

Figure 7:
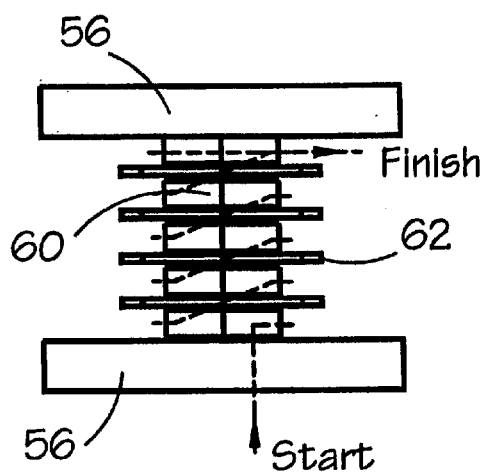
FIG. 7 shows a schematic view of a coil being wound in accordance with one embodiment of the invention.

FIG. 7 shows a top view of a former similar to that in FIG. 6, except that instead of having one side plate 56, N discate sections 60 and N fin sections 62, it has two side plates, N discate sections 60 and N-1 fin sections 62. This construction is an alternative embodiment of the invention.

FIG. 7 shows by dashed lines the path of the wire used to form the coil around the one (upper) end post 58. The wire is led in through the side of the former, at the position marked "Start". The wire is bent through an angle so that it can enter the first upper guide channel. It is taken over the arcuate outer surface of part of the first discate section 60 adjacent the plate 56 and led down the long side of the former to the first channel in other (lower) end post 59. It passes around the other end post in the corresponding first guide channel. As it enters the opposite side of the first upper guide channel to complete the first turn, it is led across from the first discate section to the second discate section, through the gap in the finned section 62 created by the cutaway profile 64, to begin the second turn in the second upper guide channel. It will be seen that the finned section defines the first guide channel, holding the wire in the correct position, only allowing it to move across to the next guide channel as the wire clears the cutaway profile 64. Successive turns are completed in the same way by repeating the winding process moving along the post at the completion of each turn at the cutaway 64. The finish of the last turn of the first layer is led up over the start of the last turn to begin the next layer. It will be understood that the next layer of the coil is produced following the same procedure, except that the wire traverses in the opposite direction between discate sections, progressing back with each turn towards the plate 56.

The finned sections 62 ensure that the wires in the long sides of the coil are parallel to each other and that all of the transpositions between one layer and the next are completed in the end region. This ensures that there are no voids in the active sides of the coil and that the extra thickness associated with the transposition between layers is all contained in the overhang of the winding.

Figure 1:
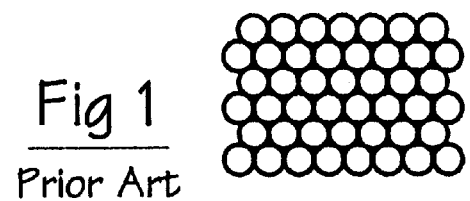
FIG. 1 shows a cross-section of a close-packed coil made from round wire.
Figure 2:
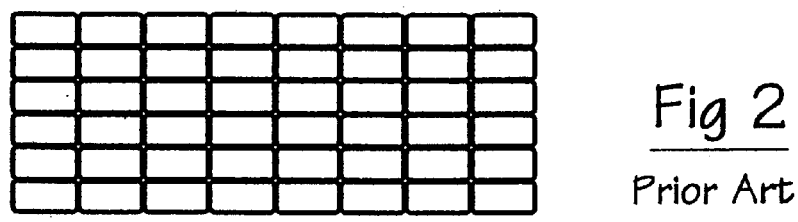
FIG. 2 shows a cross-section of a close-packed coil made from rectangular wire.
Figure 3:
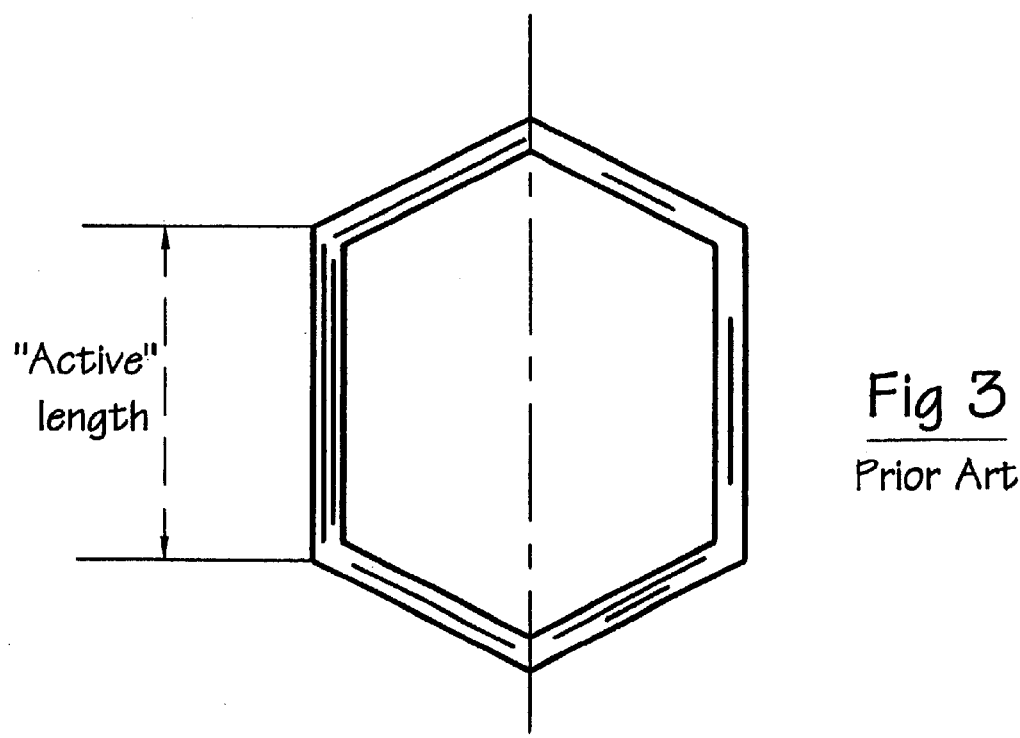
FIG. 3 shows a typical diamond-shaped coil for a distributed winding.
Figure 4:
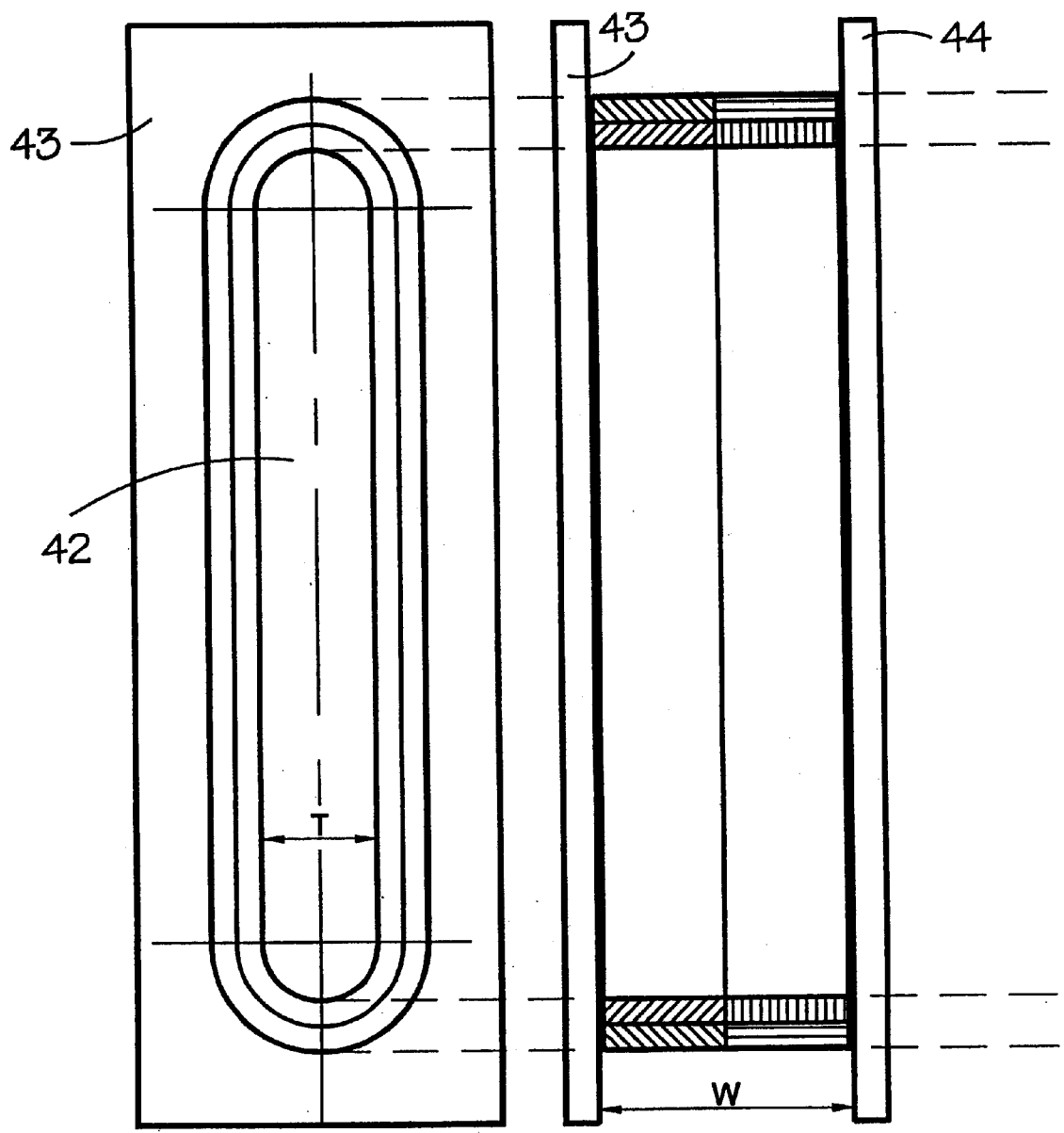
FIG. 4 shows a typical prior art former and coil in schematic form.
Figure 5:
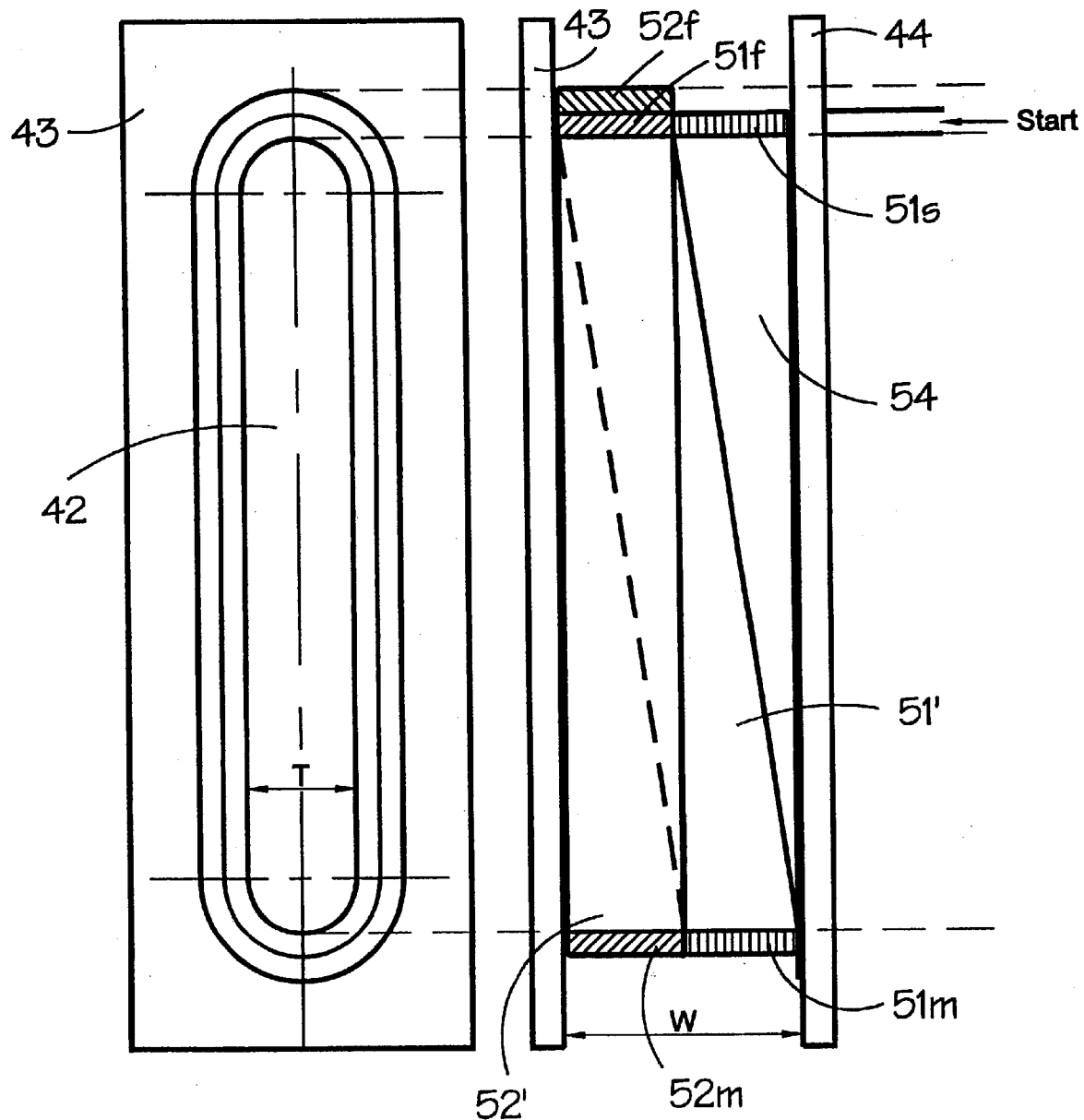
FIG. 5 shows a typical prior art rectangular wire coil during manufacture.

Having completed the winding of the coil, with however many layers are required, the former is dismantled by detaching the posts 58/59 from the plate(s) 56 so that the coil can be removed. The end posts 58/59 at this stage remain in place in the coil, as the finned sections are gripped between the turns of the coil. To remove each post, it is pulled toward the center of the coil and then rotated through 90°. Since the dimension Y is not greater than dimension Z, the end section of the former can be removed through the void in the center of the coil. The same procedure is followed for the other post. The sides of the coil are then pressed together to remove the gaps left by the finned sections (i.e. so that the sides are close-packed as shown in FIG. 2). The coil can then be secured by ties or tape in the conventional way prior to being fitted to a stator pole.

The end posts 58/59 of the former can be made in one piece, e.g. from aluminum or steel. This gives good strength to the finned section. It is desirable to machine them accurately, avoiding small blemishes in the profile, as any blemishes can result in damage to the enamel on the wire as the coil is wound. Such damage is hard to detect after the coil is completed but, if it remains undetected, it can lead eventually to coil failure through insulation breakdown. If a change is required of the width of the wire to make a slightly different coil, a new end post has to be machined. In the preferred embodiment, the end post is composed of the stack of individual discate and finned sections made from a plastic material. The finned sections can be made from a sheet of material of suitable thickness. They can be produced by many known methods, including cutting, stamping or any suitable machining process. Since the thickness of the finned section is determined mainly by the strength required to guide the wire during winding, rather than any dimension of the finished coil, any convenient stock thickness of sheet can be used. The discate sections can be made by stamping from sheet if a suitable thickness of sheet is available, but, because the thickness of this section must match the width of the wire, it may be more suitable to machine it from solid stock. It will be realized that a change to the wire width can now be accommodated simply by exchanging the discate sections for ones corresponding to the new wire width. By using individual components in a stack it is significantly easier to produce a former free from surface blemishes which might cause the wire damage referred to above.

The material used for the end sections should be strong enough to withstand the forces of the wire during winding, especially during transposition, but should have sufficient resilience to avoid damage to the wire enamel. Several plastic materials meet this requirement, especially some in the nylon family. In particular, the nylon TIVAR™ 1000 UHMW-PE has been found to be appropriate.

The end posts, whether made from one piece or from several, can be attached to the sides of the former in any convenient way, many of which are known in the prior art, e.g. by through-bolts, quick-release toggle arrangements, etc. The plates of the former can be conventional and made from metal or other material as convenient for strength, durability and economy of manufacture.

When the end posts are made up as a stack of individual components, the dimensional requirements of Y not being greater than Z need not be adhered to. The components of the stack can be removed individually; the discate sections being removed through the void in the center of the coil, and the finned sections being removed parallel to plate 56.

Figure 8:
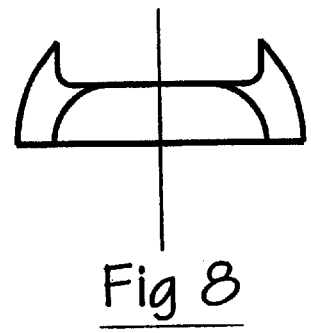
FIG. 8 shows an alternative profile for the end portion of a coil former according to an embodiment of the invention.

The profile of the discate sections is shown in FIG. 6, for illustration, as semi-circular. This produces a semi-circular form in the overhang at the ends of the finished coil, i.e. the inactive length. In order to reduce the overall length of the coil (to save space in the final machine assembly and to reduce the material cost of the coil), it is often desired to flatten off the ends of the coil. This can be achieved by a former having end posts with a profile as shown in FIG. 8. In general, the degree to which the overhang can be flattened is determined by the minimum bending radius of the enamel covering on the wire, since bending round a smaller radius will run the risk of cracking the enamel and producing an eventual insulation failure.

It will be appreciated that while the invention can be used to wind coils of round wire, it is more suited to coils made from rectangular strip, either wound on its edge or wound on its flat. With rectangular wire, the process of winding can be greatly speeded up compared with the traditional method of forming the transpositions by hand, while at the same time greatly reducing the amount of damage inflicted on the wire enamel.

In an alternative embodiment, the opposite end post is plain, serving simply to define the opposite extent of the winding. However, it is found that care is needed in winding on such a former without guide channels at both ends. Thus, guide channels at both ends are preferred although the aperture defined by the is cutaway is preferred at least at the one end where the winding wire is required to traverse to an adjacent guide channel to start the next turn.

A variant of this former design is to retain the solid body of the prior art former and insert pins in it to replicate the function of the finned sections 62. At least two pins are required to replace each finned section. In practice, however, it has been found that the pins have insufficient strength and are prone to breakage, whereas the finned sections made from nylon are sufficiently resilient to withstand the winding process.

The skilled person will appreciate that variation of the disclosed arrangements is possible without departing from the invention, particularly in the details of the shape of the discate and finned sections. Accordingly, the above description of several embodiments is made by way of example and not for the purposes of limitation. It will be clear to the skilled person that minor modifications can be made to the former design and method of use described above. The present invention is intended to be limited only by the scope of the following claims.

What is claimed is:

1. A former for winding layered turns of a conductor, the former comprising a member and a pair of spaced end posts on the member for supporting a winding between them, at least one of the end posts defining at least a pair of adjacent guide channels each having a base, and a side wall between the channels, in which the side wall has an aperture for allowing a conductor extending along one channel to traverse into the adjacent channel.

2. A former as claimed in claim 1 in which the aperture is a gap in the side wall.

3. A former as claimed in claim 2 in which the aperture is partially defined by a portion that is flush with, or extends below, the base of each of the adjacent channels.

4. A former as claimed in claim 1 in which the base comprises a longitudinally arcuate portion, or a substantially flat middle portion, remote from the other of the end posts.

5. A former as claimed in claim 1 in which the at least one end post is of a unitary construction.

6. A former as claimed in claim 1 in which the at least one end post is formed of a stack of fin parts defining the or each side wall, and intermediate parts defining the base of the channels.

7. A former as claimed in claim 1 in which the at least one end post is demountable from the member.

8. A fanner as claimed in claim 1 in which the end posts are made of one of a rigid plastic material and a metal.

9. A former as claimed in claim 8 in which the rigid plastic material is nylon.

10. A former as claimed in claim 8 in which the metal is aluminum.

11. A former as claimed in claim 1 in which the width of the at least one end post, defined by the lateral distance (Z) from one end of the base of one of the channels to the other end, is greater than the extent (Y) of the side wall measured normally to the said lateral distance, such that the at least one end post is removable from the winding formed between the end posts.

12. A former for winding layered turns of a conductor, the former comprising means for supporting a winding, the means for supporting comprising a pair of spaced end posts, at least one of the end posts defining at least a pair of adjacent guide channels each having a base, and a side wall between the channels, in which the side wall has means for allowing a conductor extending along one channel to traverse into the adjacent channel, wherein the means for allowing defines an aperture for allowing the conductor to traverse into the adjacent channel.

13. A former as claimed in claim 12, in which the at least one end post comprises a stack of fm parts defining the or each side wall, and intermediate parts defining the base of the channels.

14. A former as claimed in claim 12, in which the width of the at least one end post, defined by the lateral distance (Z) from one end of the base of one of the channels to the other end, is greater than the extent (Y) of the side wall measured normally to the said lateral distance, such that the at least one end post is removable from the winding formed between the end posts.

15. A former for winding layered turns of a conductor, the former comprising a member and a pair of spaced end posts on the member for supporting a winding between them, at least one of the end posts defining at least a pair of adjacent guide channels each having a base, and a side wall between the channels, in which the side wall has an aperture for allowing a conductor extending along one channel to traverse into the adjacent channel, the aperture being a gap in the side wall and being at least partially defined by a portion that is flush with or extends below the base of each of the adjacent channels, the at least one end post being formed of a stack of fin parts defining the or each side wall, and intermediate parts defining the base of the channels, the width of the at least one end post, defined by the lateral distance (Z) from one end of the base of one of the channels to the other end, being greater than the extent (Y) of the side wall measured normally to the said lateral distance, such that the at least one end post is removable from the winding formed between the end posts.

16. A method of winding layered turns of a conductor, the method comprising forming a winding between a pair of spaced end posts on a member of a former, at least one of the end posts defining at least a pair of adjacent guide channels each having a base, and a side wall between the channels, and traversing a conductor extending along one channel into the adjacent channel by an aperture in the side wall.

17. A method as claimed in claim 16, further comprising forming the one end post of a stack of fin parts defining the or each side wall and intermediate parts defining the base of the channels.

18. A method as claimed in claim 16, further comprising removing the at least one end post from the winding formed between the end posts, the width of the at least one end post, defined by the lateral distance (Z) from one end of the base of one of the channels to the other end, being greater than the extent (Y) of the side wall measured normally to the said lateral distance.

19. A former for winding layered tins of a conductor, the former comprising a member and a pair of spaced end posts on the member for supporting a winding between them, at least one of the end posts defining at least a pair of adjacent guide channels each having a base, and a side wall between the channels, in which the side wall has a cutaway profile for allowing a conductor extending along one channel to traverse into the adjacent channel.

20. A fanner for winding layered turns of a conductor, the former comprising a member and a pair of spaced end posts on the member for supporting a winding between them, at least one of the end posts defining at least a pair of adjacent guide channels each having a base, and a side wall between the channels, in which the side wall has a gap for allowing a conductor extending along one channel to traverse into the adjacent channel.

* * * * *

UNITED STATES PATENT AND TRADEMARK OFFICE
CERTIFICATE OF CORRECTION

PATENT NO. : 6,536,701 B2
DATED : March 25, 2003
INVENTOR(S) : Fulton et al.

It is certified that error appears in the above-identified patent and that said Letters Patent is hereby corrected as shown below:

Column 4,
Line 27, "fm" has been changed to -- fin --.
Line 29, "condition" has been changed to -- conductor --.

Column 7,
Line 26, "fanner" has been changed to --former --.
Line 50, "fm" has been changed to -- fin --.

Column 8,
Line 40, "tins" has been changed to -- turns --.
Line 48, "fanner" has been changed to -- former --.

Signed and Sealed this

Fifth Day of August, 2003

JAMES E. ROGAN
*Director of the United States Patent and Trademark Office*